(12) United States Patent
Mori

(10) Patent No.: US 11,763,679 B2
(45) Date of Patent: Sep. 19, 2023

(54) NOTIFICATION SYSTEM AND NOTIFICATION METHOD

(71) Applicant: CANON KABUSHIKI KAISHA, Tokyo (JP)

(72) Inventor: Shingo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/489,224

(22) Filed: Sep. 29, 2021

(65) Prior Publication Data

US 2022/0108614 A1 Apr. 7, 2022

(30) Foreign Application Priority Data

Oct. 6, 2020 (JP) .................................. 2020-169212

(51) Int. Cl.
*G08G 1/16* (2006.01)
*G08G 1/0967* (2006.01)
*G08B 7/06* (2006.01)
*B60W 40/08* (2012.01)
*G06V 20/59* (2022.01)

(52) U.S. Cl.
CPC ............. *G08G 1/166* (2013.01); *B60W 40/08* (2013.01); *G06V 20/597* (2022.01); *G08B 7/06* (2013.01); *G08G 1/096725* (2013.01); *G08G 1/164* (2013.01); *B60W 2040/0818* (2013.01); *B60W 2040/0872* (2013.01); *B60W 2540/221* (2020.02); *B60W 2540/223* (2020.02); *B60W 2540/26* (2013.01)

(58) Field of Classification Search
CPC .. G08G 1/166; G08G 1/096725; G08G 1/164; G08G 1/005; G08G 1/0133; G08G 1/04; G08G 1/056; G08G 1/162; B60W 40/08; B60W 2040/0818; B60W 2040/0872; B60W 2540/221; B60W 2540/223; B60W 2540/26; B60W 30/09; B60W 2554/4029; B60W 2556/45; G06V 20/597; G06V 40/161; G08B 7/06
See application file for complete search history.

(56) References Cited

U.S. PATENT DOCUMENTS

2020/0007523 A1\* 1/2020 Tan ....................... H04W 4/10

FOREIGN PATENT DOCUMENTS

| JP | 2016113138 A | 6/2016 |
| JP | 2019079467 A | 5/2019 |
| WO | WO-2017136627 A1 \* | 8/2017 |

\* cited by examiner

*Primary Examiner* — Daryl C Pope
(74) *Attorney, Agent, or Firm* — Canon U.S.A., Inc. IP Division

(57) ABSTRACT

A system includes a first notifying unit, a detection unit, and a second notifying unit. The first notifying unit performs a first notification for notifying a target in a predetermined area of an abnormality, in a case where an abnormal state occurs in a running vehicle. The detection unit detects presence of a target unaware of the first notification. The second notifying unit performs a second notification for notifying the target in the predetermined area of the abnormality, in a case where the presence of the target unaware of the first notification is detected.

13 Claims, 7 Drawing Sheets

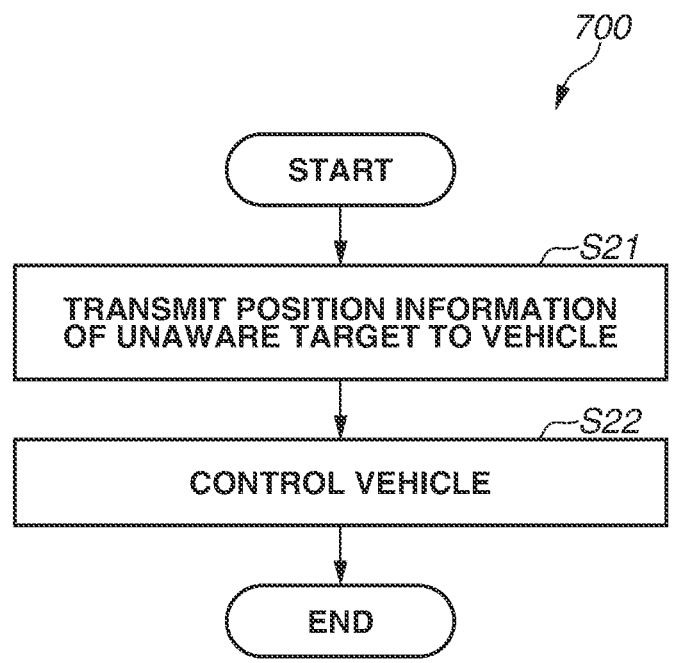

NOTIFICATION SYSTEM AND NOTIFICATION METHOD

BACKGROUND

Field of the Disclosure

Aspects of the disclosure generally relate to a system that can notify a person such as a pedestrian of an abnormality in a running vehicle, and a method used in this system.

Description of the Related Art

There has been discussed a method of detecting an abnormality occurring inside a vehicle such as a malfunction of the vehicle or sudden illness of a driver, and notifying the abnormality to the outside of the vehicle. Japanese Patent Application Laid-Open No. 2016-113138 discusses a method of notifying an abnormality in a driver to the outside of a vehicle by operating a movable unit disposed on the outer side of the vehicle in a case where the abnormality is detected. Japanese Patent Application Laid-Open No. 2019-79467 discusses a method of perceiving a malfunction of a vehicle, by collecting information about the vehicle in a data center via an information collection device installed near a road, and accurately perceiving the state of the vehicle using the collected information.

SUMMARY

According to some embodiments, in a case where an abnormality in a vehicle is detected, a notification device installed near a road is operated, so that a pedestrian or the like can be notified of the abnormality in the vehicle. For example, when sudden illness of a driver is detected by a camera installed in a vehicle, a warning sound can be emitted from a speaker installed near a crosswalk in the moving direction of the vehicle, or a warning light can be turned on.

According to some embodiments, even in a case where a pedestrian is operating a smartphone or listening to music with headphones, the pedestrian can be notified of an abnormality in a vehicle.

According to some embodiments, there is provided a system including a first notifying unit that performs a first notification for notifying a target in a predetermined area of an abnormality, in a case where an abnormal state occurs in a running vehicle, a detection unit that detects presence of a target unaware of the first notification, and a second notifying unit that performs a second notification for notifying the target in the predetermined area of the abnormality, in a case where the presence of the target unaware of the first notification is detected.

According to some embodiments, there is provided a method including performing a first notification for notifying a target in a predetermined area of an abnormality, in a case where an abnormal state occurs in a running vehicle, detecting presence of a target unaware of the first notification, and performing a second notification for notifying the target in the predetermined area of the abnormality, in a case where the presence of the target unaware of the first notification is detected.

Further aspects of the disclosure will become apparent from the following description of exemplary embodiments.

BRIEF DESCRIPTION OF THE DRAWINGS

FIG. 7 is a flowchart illustrating a vehicle control process performed by the vehicle control system according to the second exemplary embodiment.

DESCRIPTION OF THE EMBODIMENTS

Exemplary embodiments, features, and aspects of the disclosure will be described below with reference to the drawings. However, aspects of the disclosure are not limited to the following embodiments.

[First Exemplary Embodiment] A first exemplary embodiment will be described with reference to FIG. 1 to FIG. 4.

In the first exemplary embodiment, there will be described, as an example, an abnormality notification system that performs notification to a target from a notification device installed near a place such as a crosswalk, when detecting a vehicle abnormality in a running vehicle, such as a malfunction of the vehicle or sudden illness of a driver. Here, the target of the notification is mainly a pedestrian or a bicycle rider. The target may be an animal other than a human being, or may be a driver of a mobility device other than a bicycle.

In the first exemplary embodiment, an example in which sudden illness of a driver is detected as a vehicle abnormality will be used for the description. However, a vehicle abnormality detection apparatus may be configured to detect either sudden illness of a driver or a malfunction of a vehicle as a vehicle abnormality, or may be configured to detect both of sudden illness of a driver and a malfunction of a vehicle as vehicle abnormalities.

Figure 1:
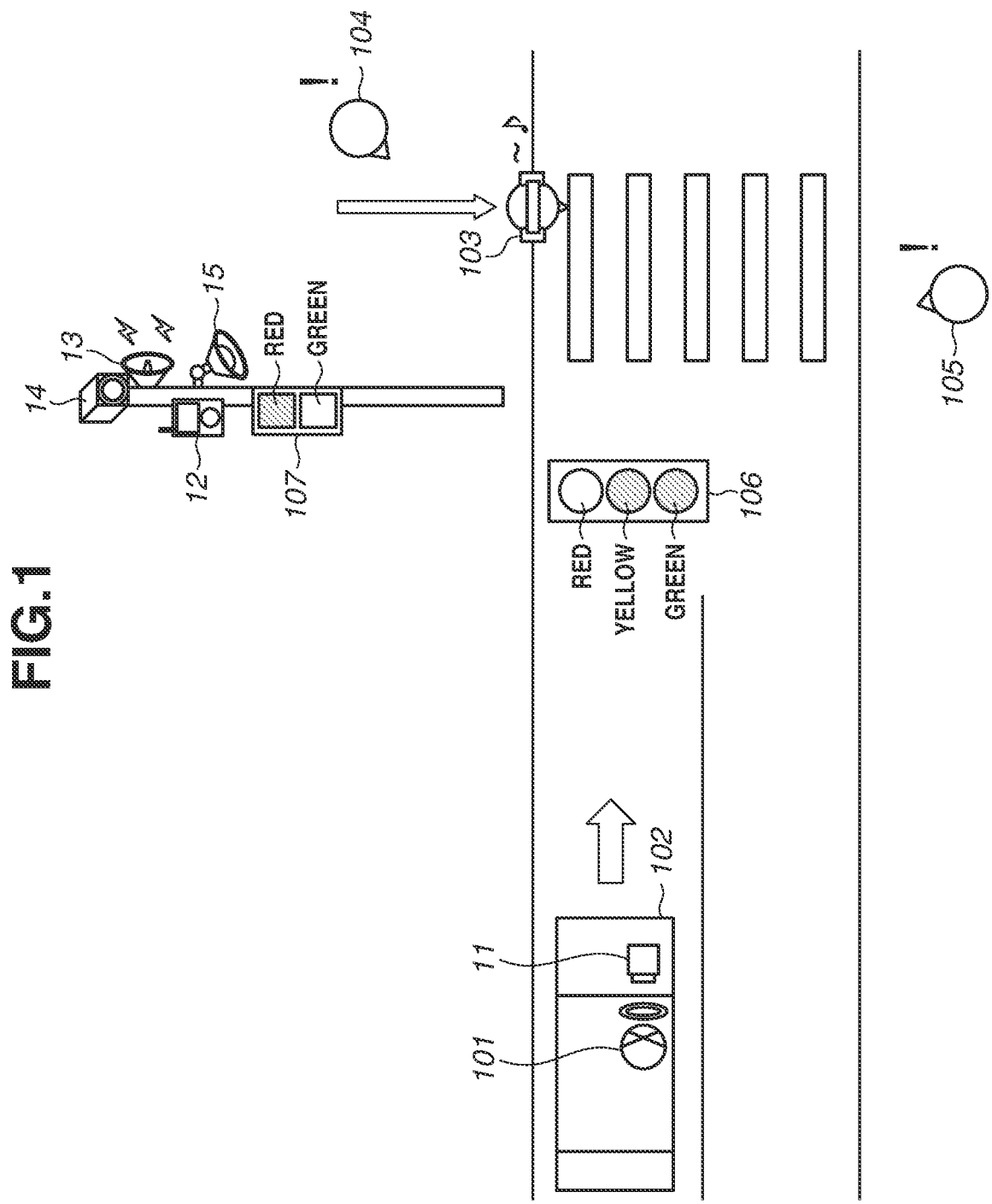
FIG. 1 is a diagram illustrating an example of a situation to which an abnormality notification system according to a first exemplary embodiment is applicable.

FIG. 1 is a diagram illustrating an example of a situation to which an abnormality notification system 1 in the first exemplary embodiment is applicable. FIG. 1 illustrates a situation near a crosswalk. FIG. 1 illustrates a scene where a vehicle 102 uncontrollable due to sudden illnesses of a driver 101 or the like approaches a crosswalk where a pedestrian 103 is present. This is a state where, among the pedestrian 103 and pedestrians 104 and 105 in FIG. 1, the pedestrian 103 is listening to music with headphones and thus is unaware of a warning sound for notifying a vehicle abnormality. Furthermore, a vehicle traffic light 106 displays a red light indicating "stop", and a pedestrian traffic light 107 displays a green light indicating "go". In this example, because the pedestrian 103 is unaware of the warning sound, there is a possibility that the pedestrian 103 starts walking on the crosswalk in response to the pedestrian traffic light 107, even though the vehicle 102 is approaching.

Figure 2:
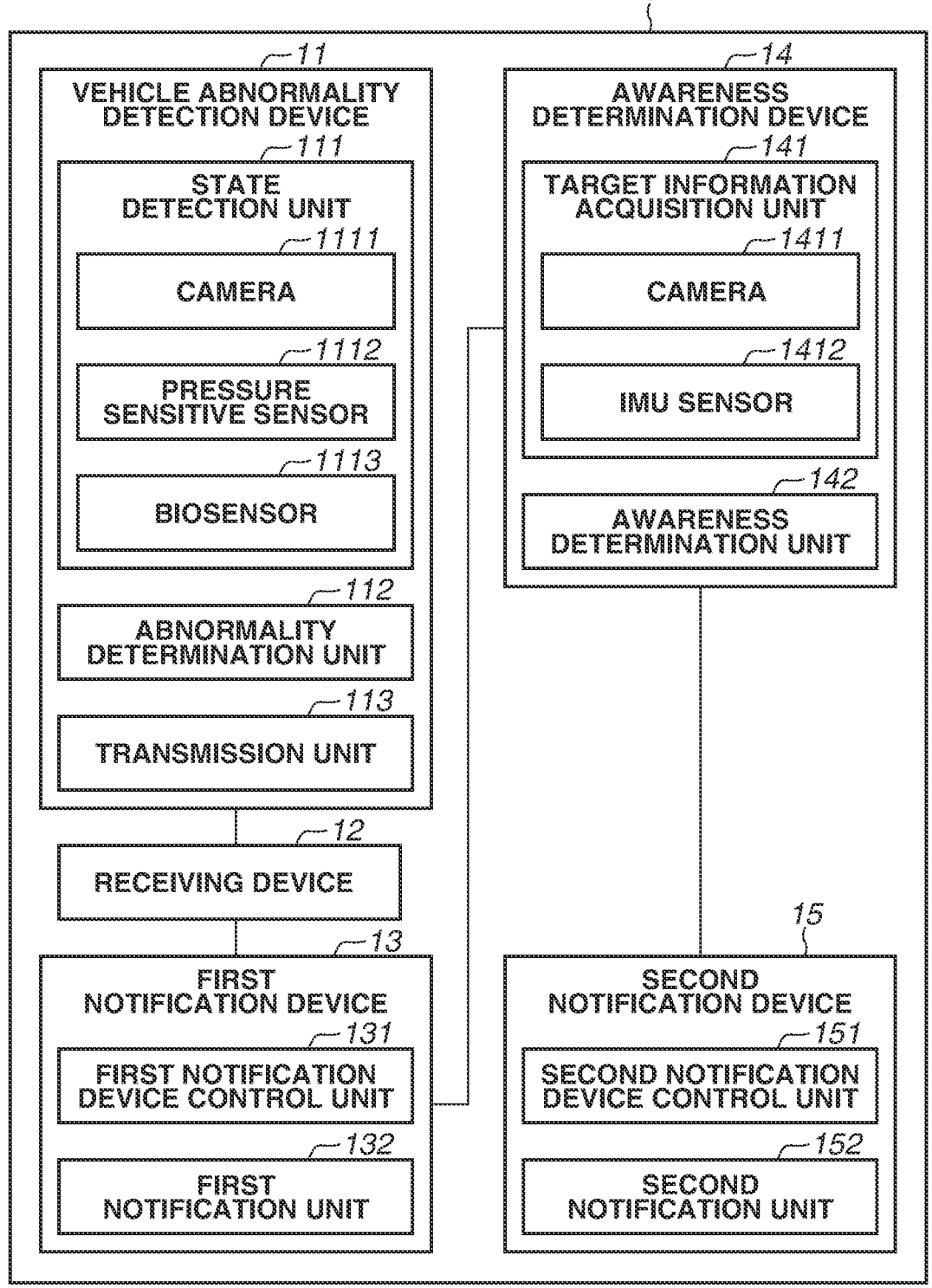
FIG. 2 is a block diagram illustrating elements of the abnormality notification system according to the first exemplary embodiment.

FIG. 2 is a block diagram illustrating elements of the abnormality notification system 1 in the first exemplary embodiment. The abnormality notification system 1 includes a vehicle abnormality detection device 11, a receiving device 12, a first notification device 13, an awareness determination device 14, and a second notification device 15. Each of these devices includes a known microcomputer having a central processing unit (CPU), a read only memory (ROM), and a random access memory (RAM) as main components.

The vehicle abnormality detection device 11 includes a state detection unit 111, an abnormality determination unit 112, and a transmission unit 113.

The state detection unit 111 is configured to acquire information about the driver 101 driving the vehicle 102, and includes a camera 1111 that captures the driver 101, a pressure sensitive sensor 1112 that measures the posture of the driver 101, and a biosensor 1113 that measures biological information such as the heartbeat, temperature, and blood pressure of the driver 101.

The abnormality determination unit 112 is a functional block implemented by executing an application program. The abnormality determination unit 112 has a function of determining whether there is an abnormality in the driver 101, based on an output from each of the sensors of the state detection unit 111.

The transmission unit 113 has a function of transmitting a signal indicating the determination result of the abnormality determination unit 112 to the outside of the vehicle 102. This signal is information indicating that the vehicle 102 running is in an abnormal state because of sudden illness of the driver 101.

The receiving device 12 has a function of receiving the signal indicating the vehicle abnormality (an abnormality signal) transmitted from the vehicle abnormality detection device 11. The receiving device 12 further has a function of outputting a signal indicating the reception of the abnormality signal to the first notification device 13, when receiving the abnormality signal.

The first notification device 13 includes a first notification device control unit 131 and a first notification unit 132. The first notification device 13 has a function of notifying a vehicle abnormality to a target in a predetermined area such as an area near a crosswalk. Here, the target is a person to be notified, such as a pedestrian or a bicycle rider.

The first notification unit 132 is a speaker and has a function of outputting a warning sound.

The first notification device control unit 131 is a functional block implemented by executing an application program. The first notification device control unit 131 controls the output of the first notification unit 132, based on the signal indicating the reception of the abnormality signal input from the receiving device 12. In the first exemplary embodiment, the first notification unit 132 is the speaker, and therefore, the first notification device control unit 131 controls ON/OFF of the output of the warning sound, the volume of the warning sound, and the like. The first notification device control unit 131 further has a function of outputting a signal indicating that the notification has been made to the awareness determination device 14.

The first notification unit 132 has the function of outputting the warning sound.

The awareness determination device 14 includes a target information acquisition unit 141 and an awareness determination unit 142.

The target information acquisition unit 141 has a function of acquiring information about a target near the first notification device 13, and includes a camera 1411, and an inertial measurement unit (IMU) sensor 1412 mounted on a mobile device such as a smartphone possessed by the target. The camera 1411 is a single-lens camera or a compound-eye camera, and has a function of acquiring an image of the target near the first notification device 13 and distance information indicating the distance from the camera 1411 to the target, as the information about the target. The IMU sensor 1412 has a function of acquiring acceleration information and angular velocity information of the mobile device. The target information acquisition unit 141 further has a function of outputting the recorded image, the distance information, the acceleration information, the angular velocity information, and the like to the awareness determination unit 142.

The awareness determination unit 142 is a functional block implemented by executing an application program. The awareness determination unit 142 has a function of determining whether the target is aware of the notification by the first notification device 13, based on the information about the target acquired by the target information acquisition unit 141, and a function of outputting a signal indicating the determination result to the second notification device 15.

The second notification device 15 includes a second notification device control unit 151 and a second notification unit 152. The second notification device 15 has a function of notifying the vehicle abnormality again to the target near the crosswalk and unaware of the notification by the first notification device 13.

The second notification unit 152 is a light and has a function of illuminating the area near the crosswalk.

The second notification device control unit 151 is a functional block implemented by executing an application program. The second notification device control unit 151 controls the second notification unit 152, based on the signal input from the awareness determination device 14. In the first exemplary embodiment, the second notification unit 152 is the light, and thus, the second notification device control unit 151 controls ON/OFF of light emission and the amount of the light emission.

In the first exemplary embodiment, the second notification device 15 emits the light, not a sound, but other type of notification device may be used as long as the device performs notification using a notification unit or a notification method different from that of the first notification device 13. The first exemplary embodiment is an embodiment in which the notification units vary, but the second notification device 15 may also be a speaker as with the first notification device 13, and may employ a different notification method such as outputting a different notification sound. Making the notification units or notification methods vary corresponds to making notification modes vary.

Furthermore, in a case where the target information acquisition unit 141 is a mobile device, the second notification device 15 may be configured to communicate with the mobile device carried by the target and transmit a signal to notify a vehicle abnormality to the target via the mobile device.

The first exemplary embodiment is an embodiment in which the first notification device 13 and the second notification device 15 are installed near the crosswalk. However, in the case where the second notification device 15 communicates with the mobile device and transmits the signal indicating the vehicle abnormality as described above, it is not necessary to install the first notification device 13 and the second notification device 15 near the crosswalk.

Figure 3:
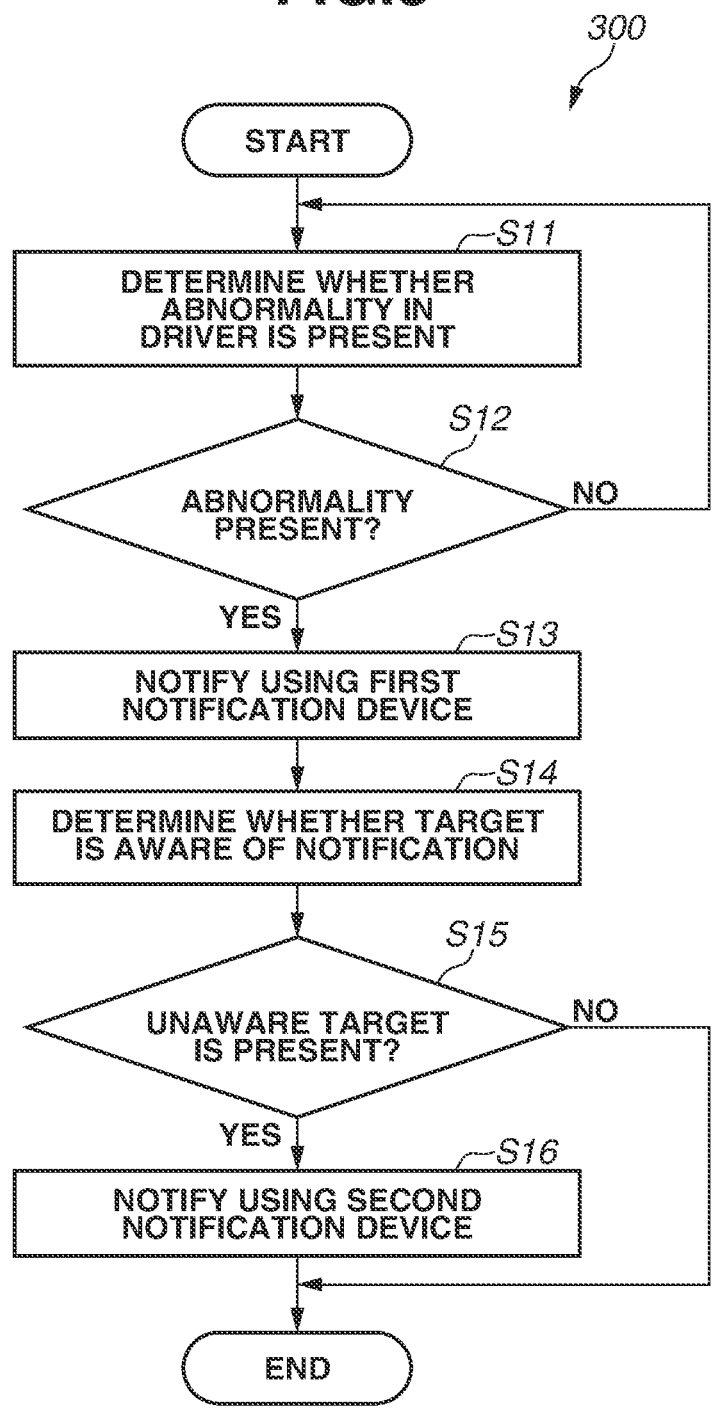
FIG. 3 is a flowchart illustrating a notification process performed by the abnormality notification system according to the first exemplary embodiment.

FIG. 3 is a flowchart illustrating a notification process 300 performed by the abnormality notification system 1 in the first exemplary embodiment. The notification process 300 illustrated in the flowchart of FIG. 3 is a process including the detection of a vehicle abnormality such as a malfunction of a vehicle or sudden illness of a driver by the vehicle abnormality detection device 11 and the execution of notification. The output of each of the notification devices before detecting the vehicle abnormality is OFF (in a state where no sound is output from the speaker and the light is turned off).

In step S11, the vehicle abnormality detection device 11 determines whether an abnormality in the driver 101 (a vehicle abnormality) is present, based on an image and sensor signals output by the state detection unit 111. Here, the abnormality refers to a state where it is difficult for the driver 101 to continue driving the vehicle 102.

In the first exemplary embodiment, any of various methods can be used as the method of detecting the abnormality in the driver 101. For example, a pressing force in an area that is a part of a seat of the vehicle 102 and contacted by the buttocks or back of the driver 101 is detected, and a posture of the driver 101 is determined based on the distribution of the pressing force, so that an abnormality in the driver 101 is determined. For another example, there may be adopted a method of detecting a state where the eyes of the driver 101 are rolled up into the head thereof from an image with the face of the driver 101, and determining that there is an abnormality in the driver 101 when this state continues for a predetermined time.

In step S12, the process branches based on the determination result of the vehicle abnormality detection device 11. If the vehicle abnormality detection device 11 determines that no vehicle abnormality is present (NO in step S12), the notification process 300 returns to step S11, and step S11 and step S12 are repeated. If the vehicle abnormality detection device 11 determines that a vehicle abnormality is present (YES in step S12), the notification process 300 proceeds to step S13.

In step S13, the first notification device 13 notifies a target near the crosswalk that there is a vehicle abnormality in an incoming vehicle. First, the transmission unit 113 of the vehicle abnormality detection device 11 transmits a signal (an abnormality signal) indicating the presence of a vehicle abnormality to the receiving device 12 located outside the vehicle 102. Upon receiving the abnormality signal, the receiving device 12 transmits the information thereof to the first notification device 13, and the first notification device 13 performs notification by outputting a warning sound at a predetermined volume from the speaker.

In step S14, the awareness determination device 14 determines whether the target is aware of the warning sound. This determination of the awareness is performed based on an image, acceleration information, and angular velocity information output by the target information acquisition unit 141.

In the first exemplary embodiment, any of various methods can be used as the determination method based on the image. In the first exemplary embodiment, for example, the awareness determination device 14 determines that the target is aware of the notification in a case where the line of sight or the face of the target is directed at the speaker, and determines that the target is unaware of the notification in a case where the line of sight or the face of the target is not directed at the speaker.

Known methods for detecting the face of a person from an image include a patch-based method of detecting a face by convolving a specific patch in an image, and a method based on machine learning and detecting the face of a person by training a large amount of face images. As a method for estimating the direction of a line of sight or a face from a face image, there is a method of estimating the direction of a line of sight or a face by detecting three-dimensional position information about a feature amount of the face.

Other determination methods may be adopted. The awareness of the notification may be determined in a case where the target displays a gesture of being cautious about surroundings, such as moving the head from side to side or looking at a point far away on the road. The awareness of the notification may be determined in a case where a change of the posture of the target before and after the notification is greater than a predetermined threshold. The awareness may be determined using only one of these determination methods, or may be determined based on the results of determination methods.

In a method of determining based on the acceleration and the angular velocity output by the target information acquisition unit 141, the state of the target is detected from the acceleration and the angular velocity, and the awareness can be determined based on a change in the detected state.

An example thereof will be described. As the state of the target to be detected, there are three states that are "moving", "stop", and "changing course". Each of the states is determined as follows. In a case where the angular velocity of each of a roll axis, a pitch axis, and a yaw axis is more than or equal to a predetermined value, the target is determined to be moving. In a case where the angular velocity of each of these axes is less than the predetermined value, the target is determined to be at a stop. In a case where acceleration more than or equal to a predetermined value is detected while the target is moving, the target is determined to have changed the course. In a case where each of these states changes during a predetermined time period after the notification from the speaker of the first notification device 13, the target is determined to be aware of the notification. In other words, the target is determined to be aware of the notification in a case where the target starts taking an avoiding action by changing the walking direction, or stops suddenly.

In step S15, the process branches based on the determination result of the awareness determination device 14. If all the targets confirmed by the target information acquisition unit 141 are determined to be aware of the warning sound (NO in step S15), the notification process 300 ends. If there is a target (an unaware target) determined to be unaware of the warning sound (YES in step S15), the notification process 300 proceeds to step S16.

In step S16, the second notification device 15 notifies the unaware target of the vehicle abnormality by turning on the light.

The duration of the notification by each of the notification devices is set as follows, for example.

The notification by the speaker of the first notification device 13 continues for a predetermined time after the abnormality signal is no longer detected by the receiving device 12.

The notification by the light of the second notification device 15 continues until the unaware target becomes aware of the notification. In a case where a predetermined time has elapsed after the abnormality signal is no longer detected by the receiving device 12, before no unaware target is determined to be present, the notification by the light may be terminated.

In this way, according to the first exemplary embodiment, the vehicle abnormality detection device 11 detects the abnormality in the driver 101 as the vehicle abnormality, and performs the notification (the output of the warning sound from the speaker) using the first notification device 13 installed near the crosswalk. Subsequently, the awareness determination device 14 determines whether the target (the unaware target) unaware of the notification by the first notification device 13 is present, and the second notification device 15 performs the notification (turns on the light) if the unaware target is present. Accordingly, the target unaware of the notification by the first notification device 13 due to an act such as listening to music with headphones can also be notified of the vehicle abnormality, using the second notification device 15. It is therefore possible to prompt the unaware target as well to take an appropriate action such as avoiding or stopping. The risk of involvement of the target in a traffic accident by the vehicle in the abnormal state can be therefore reduced.

Furthermore, according to the first exemplary embodiment, when the second notification device operates, the presence of the target unaware of the notification is noticed by the target near the unaware target, and as a result, the target aware of the notification by the second notification device can find and warn the unaware target.

The first exemplary embodiment is described above in detail, but the configuration of the abnormality notification system 1 in the first exemplary embodiment can be modified as follows.

The vehicle abnormality detection device 11 may be configured to detect a malfunction of the vehicle such as a malfunction of the brakes of the vehicle or a flat tire. The abnormality determination unit 112 determines the malfunction of the vehicle as the vehicle abnormality and transmits the abnormality signal, so that the target can be provided with information to take an appropriate action such as avoiding or stopping at the time of the malfunction of the vehicle as well.

Furthermore, the vehicle abnormality detection device 11 may be configured to detect both of the malfunction of the vehicle and the abnormality in the driver. The target can be provided with information to take an appropriate action such as avoiding or stopping, in response to various kinds of abnormality detection in the vehicle.

The first notification device 13 and the second notification device 15 may each use other notification methods such as use of an electric signboard, popup notification of a smartphone, and use of vibrations of a smartphone. If the notification is performed using various methods, the target can have more opportunities to become aware of the notification by the first notification device and the second notification device.

The abnormality notification system 1 may further include a position acquisition device having a function of acquiring position information of the target. The second notification device 15 may also have a function of informing a nearby target which target is the unaware target, in addition to the function of notifying the unaware target of the abnormality in the vehicle. The target can immediately identify the unaware target, and thus can warn the unaware target more quickly.

A method of acquiring the position information of the target by the position acquisition device will be described. Here, a stereo camera is used as an example of the position acquisition device, but other type of position acquisition device such as a device employing LiDAR (light detection and ranging) or beacon may be used.

The position acquisition device acquires the position information of the target with respect to the position information of the second notification device 15, based on an image output by the stereo camera. In this case, the position information of the target is acquired as follows. The following method is an example, and the position information may be acquired by another method.

First, pixel position information of the target in the image is calculated. This can be calculated as pixel position information (u, v) of the target, using the face detection method in the awareness determination unit 142 described above. Next, from a focal length f of the camera, a pixel size (du, dv) in the vertical direction and the lateral direction, and intersection point position information (cu, cv) of the intersection between an optical axis and an image pickup plane in the image coordinates, a coordinate transformation is performed using the following equations.

$$x=du(u-cu)/f$$

$$y=dv(v-cv)/f$$

Here, coordinates (x, y) after the transformation have the optical center of the camera as the origin, and an X-axis and a Y-axis are parallel to the lateral direction and the vertical direction of the image, respectively. Here, in a case where the optical axis is a Z-axis, the coordinates after the transformation is expressed as (x, y, 1). The coordinate system after the transformation is referred to as the camera coordinate system.

A distance z from the camera to the target can be calculated from a parallax amount of the target in images with viewpoints obtained from the stereo camera, based on triangulation. Accordingly, position information p of the target in which the optical center is the origin can be calculated by p=(xz, yz, z).

Next, the position information p of the target described in the camera coordinate system is converted into a coordinate system with respect to the position information and the initial orientation of the second notification device 15. When the transformation matrix thereof is T, position information p' of the target with respect to the position information of the second notification device 15 can be calculated by p'=Tp. The transformation matrix T can be calculated from the position information and the initial orientation of the camera and the second notification device 15. The position information of the target with respect to the position information of the second notification device 15 is thus acquired.

The second notification device 15 may have a function of informing a nearby target which target is the unaware target, based on the position information of the target acquired by the above-described method. For example, the second notification device 15 uses a spotlight that can illuminate a specific location near the crosswalk. The spotlight illuminates the unaware target, thereby notifying the unaware target of the vehicle abnormality. In addition, the target near the crosswalk can immediately notice the location of the unaware target, by looking at the target illuminated by the spotlight.

In the above-described example, the spotlight is used as an example of the second notification device 15, but other type of notification device such as a road panel for illuminating the feet of the target or an electric signboard may be used to inform a nearby target which target is the unaware target.

The abnormality notification system 1 having the above-described configuration can notify the target near the second notification device which target is the unaware target, and therefore, the target aware of the notification can more quickly warn the unaware target.

The abnormality notification system 1 may include candidates (notification device candidates) for the first notification device or the second notification device. The abnormality notification system 1 may further include a state detection device that detects a state of the target, based on the image information and distance information of the target acquired by the target information acquisition unit 141 and the information acquired by the IMU sensor 1412. Here, the state of the target refers to a state where the effect of the notification by each of the notification device candidates can be affected, such as a state where the target is looking at the smartphone or wearing sunglasses.

The abnormality notification system 1 may further include a notification-device selection device having a function of selecting an appropriate notification device from the notification device candidates, as the first notification device or the second notification device, based on an output of the state detection device. The notification device appropriate to the state of the target is selected, so that the target can be notified more effectively.

For example, in a case where there are many targets each viewing the screen of a smartphone, the smartphone is selected as the first notification device 13, and warning information is displayed on the screen of the smartphone, so that more targets can be effectively notified.

Furthermore, suppose a target wearing sunglasses is the unaware target. In this case, instead of the notification device using a visually notifying unit such as a spotlight or an electric signboard, the notification device having an auditorily notifying unit such as a directional speaker or a haptically notifying unit such as a vibrator of a smartphone is selected as the second notification device 15. The notification device that makes the unaware target easily notice the notification is thus selected, so that the unaware target can be effectively notified.

The abnormality notification system 1 may also include a risk estimation device that estimates the degree of risk for the target, based on the target position acquired by the position acquisition device described above and the image information of the target acquired by the target information acquisition unit 141. Here, the degree of risk indicates how likely the target is to be involved in a traffic accident, how seriously the target can be injured when being involved in a traffic accident, and the like.

For example, the degree of risk is set higher for a target closer to a road on which vehicles move, and the degree of risk is set higher for a slower-moving person (such as an elderly person or a person in a wheelchair).

Furthermore, at least one of the first notification device 13 and the second notification device 15 may be configured to have a function of notifying the unaware target by directing a high output to the unaware target as in the case of the spotlight or directional speaker, and to further have a function of notifying the unaware targets sequentially in descending order by risk.

The abnormality notification system 1 having the above-described configuration can provide information for more quickly taking an appropriate action such as avoiding or stopping to the target more likely to have damage, so that the risk of serious accident can be reduced.

The risk estimation device may include map information (a risk map) indicating the degrees of risk near the first notification device 13 or the second notification device 15. The risk estimation device may be configured to estimate the degree of risk for the target, based on the risk map and the position information of the target. Here, the risk map is a map indicating the degree of risk based on a road traffic environment at each spot near the first notification device 13 or the second notification device 15. In the risk map, for example, the degree of risk is set higher for a sidewalk having no guardrail.

Figure 4:
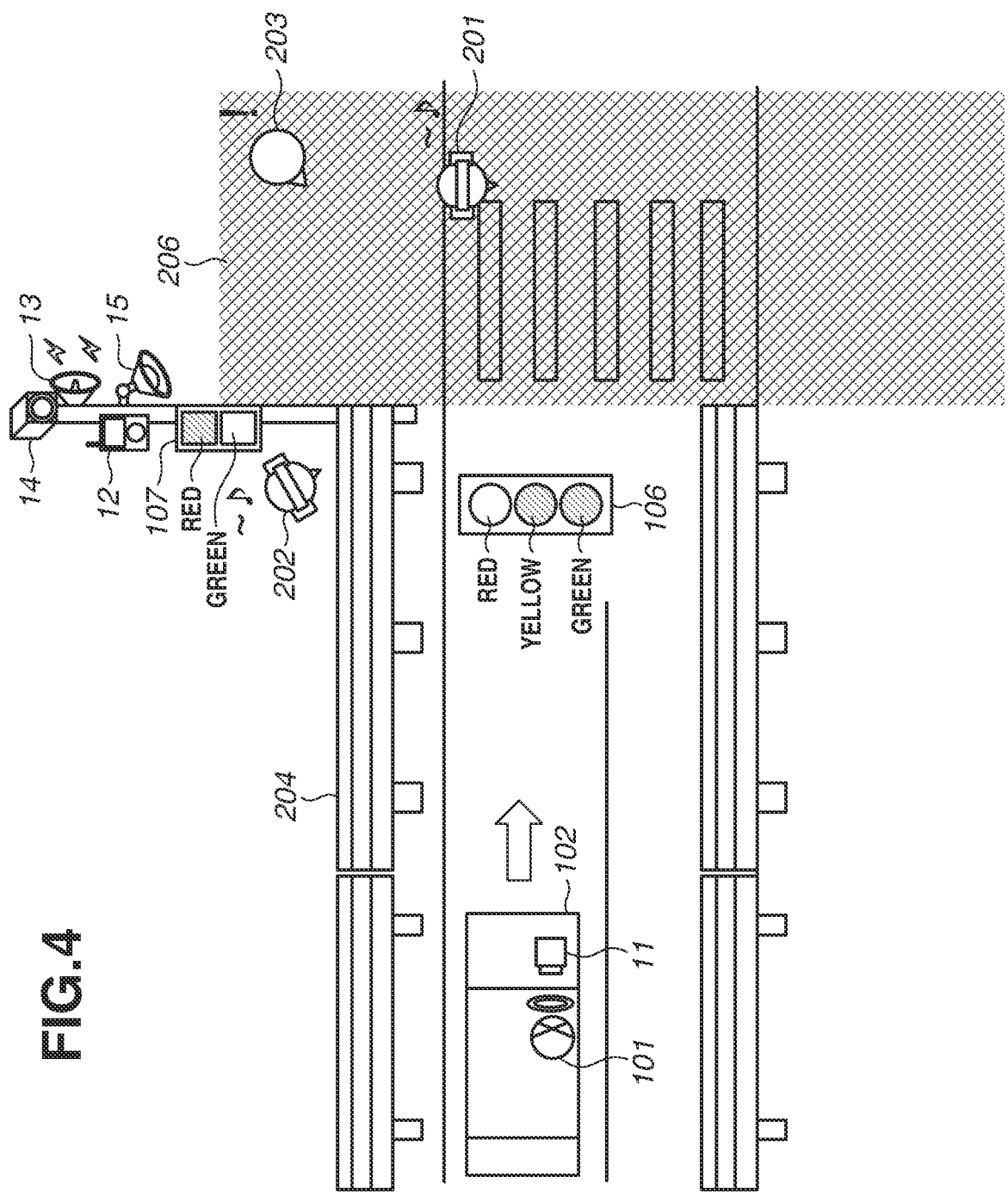
FIG. 4 is a diagram illustrating another example of a situation to which the abnormality notification system according to the first exemplary embodiment is applicable.

FIG. 4 is a diagram illustrating another example of a situation to which the abnormality notification system 1 in the first exemplary embodiment is applicable. FIG. 4 illustrates a situation near a crosswalk, and the risk estimation by the risk estimation device is applied to this situation. Parts common to the example illustrated in FIG. 1 and the example illustrated in FIG. 4 will be denoted by the same reference numerals and description thereof will be omitted.

FIG. 4 illustrates, for example, a scene where the vehicle 102 uncontrollable due to sudden illnesses of the driver 101 approaches a crosswalk where a pedestrian 201 is walking. This is a state where, among the pedestrian 201 and pedestrians 202 and 203, the pedestrians 201 and 202 are each listening to music with headphones and thus are unaware of a warning sound from the speaker of the first notification device 13.

In a shaded area 206 in FIG. 4, a guardrail 204 is not present between the target and the vehicle. For this reason, the degree of risk at each spot in the shaded area 206 is set higher than those at other spots, in the risk map included in the risk estimation device. Therefore, the risk estimation device estimates that, of the pedestrians 201 and 202 unaware of the notification, the pedestrian 201 has higher risk.

The abnormality notification system 1 using this risk estimation device can provide information for more quickly taking an appropriate action such as avoiding or stopping to the target more likely to have damage, in consideration of a road traffic environment near the first notification device 13 or the second notification device 15. Accordingly, the risk of occurrence of damage to the target can be reduced.

The risk estimation device may further include a vehicle position information acquisition device that acquires the position of a vehicle for which a vehicle abnormality is detected. Here, the position of the vehicle can be calculated from an image of the vehicle captured by the camera 1411 of the target information acquisition unit 141. In this case, for example, the risk estimation device estimates a higher degree of risk for the target closer to the vehicle, based on the position of the target and the position of the vehicle.

The abnormality notification system 1 using this risk estimation device can preferentially provide information for more quickly taking an appropriate action such as avoiding or stopping to the target more likely to have damage, in consideration of the positional relationship between the vehicle and the target. Accordingly, the risk of occurrence of damage to the target can be reduced.

The risk estimation device may further include a traffic information acquisition device that acquires traffic information such as traffic congestion and traffic volume of an area near the first notification device 13 or the second notification device 15. In this case, the risk estimation device estimates the degree of risk for the target, based on the position of the target, the position of the vehicle, and the traffic information.

For example, in a case where traffic congestion occurs between the vehicle 102 and the target near the first notification device 13 or the second notification device 15 in FIG. 4, the degree of risk is set low for the traffic lane in the vehicle moving direction and set high for the opposite traffic lane. In a case where the vehicle 102 runs in the opposite traffic lane to avoid a vehicle in the traffic congestion, contact between the vehicle 102 and a pedestrian can more easily occur in the opposite traffic lane, and thus a serious accident is more likely to occur.

The abnormality notification system 1 using this risk estimation device can preferentially provide information for more quickly taking an appropriate action such as avoiding or stopping to the target more likely to have damage, in consideration of the traffic condition near the first notification device 13 or the second notification device 15. Accordingly, the risk of occurrence of damage to the target can be reduced.

Furthermore, all the configurations of the abnormality notification system 1 may be mounted on the vehicle to transmit and receive the abnormality signal by wired communication. Because the abnormality signal is transmitted by wired communication, the period of time from the transmission to the reception of the abnormality signal is reduced, as compared with the case where the abnormality signal is transmitted and received by wireless communication. Therefore, the abnormality notification system 1 can provide information for more quickly taking an appropriate action such as avoiding or stopping to the target, so that the risk of involvement of the target in a traffic accident can be reduced.

[Second Exemplary Embodiment] Next, a second exemplary embodiment will be described with reference to FIG. 5 to FIG. 7.

The basic configuration of the second exemplary embodiment is similar to that of the first exemplary embodiment, and therefore, parts common to the second exemplary embodiment and the first exemplary embodiment will not be described, and only a part different from the first exemplary embodiment will be described. In addition, the parts common to the second exemplary embodiment and the first exemplary embodiment will be denoted by the same reference numerals.

In a vehicle control system in the second exemplary embodiment, when a vehicle abnormality such as a malfunction of a vehicle or sudden illness of a driver is detected, a notification device installed near a crosswalk notifies a nearby target (such as a pedestrian or a bicycle rider), and the vehicle is automatically controlled based on the result of the notification.

Figure 5:
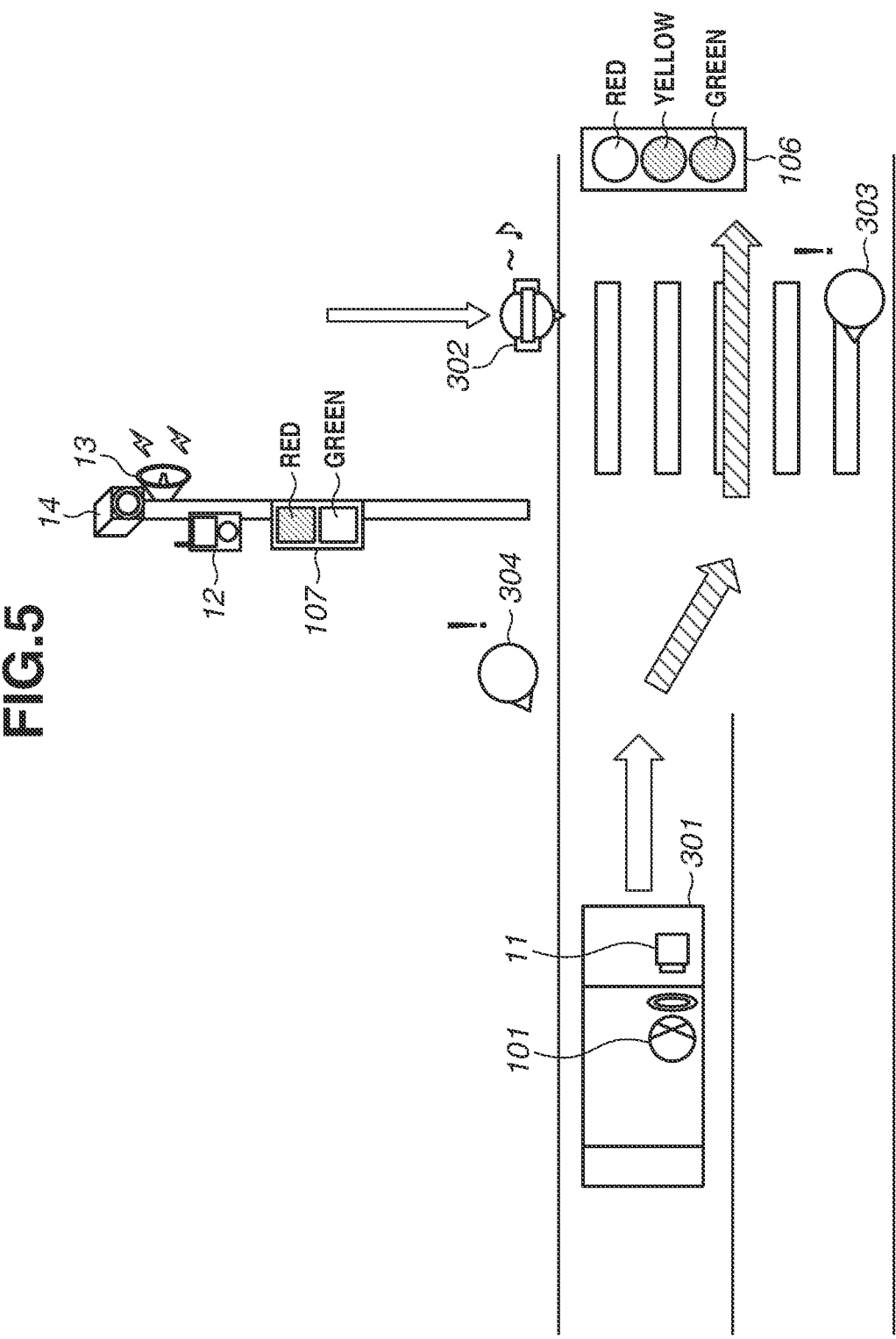
FIG. 5 is a diagram illustrating an example of a situation to which a vehicle control system according to a second exemplary embodiment is applicable.

FIG. 5 is a diagram illustrating an example of a situation to which a vehicle control system 2 in the second exemplary embodiment is applicable. FIG. 5 illustrates a situation near a crosswalk. FIG. 5 illustrates a scene where, for example, a vehicle 301 uncontrollable due to sudden illnesses of a driver 101 approaches a crosswalk where pedestrians 302 and 303 are present. Here, the pedestrian 302 in FIG. 5 is listening to music with headphones and thus is unaware of a warning sound from a speaker of a first notification device 13. A vehicle traffic light 106 displays a red light indicating "stop", and a pedestrian traffic light 107 displays a green light indicating "go".

Figure 6:
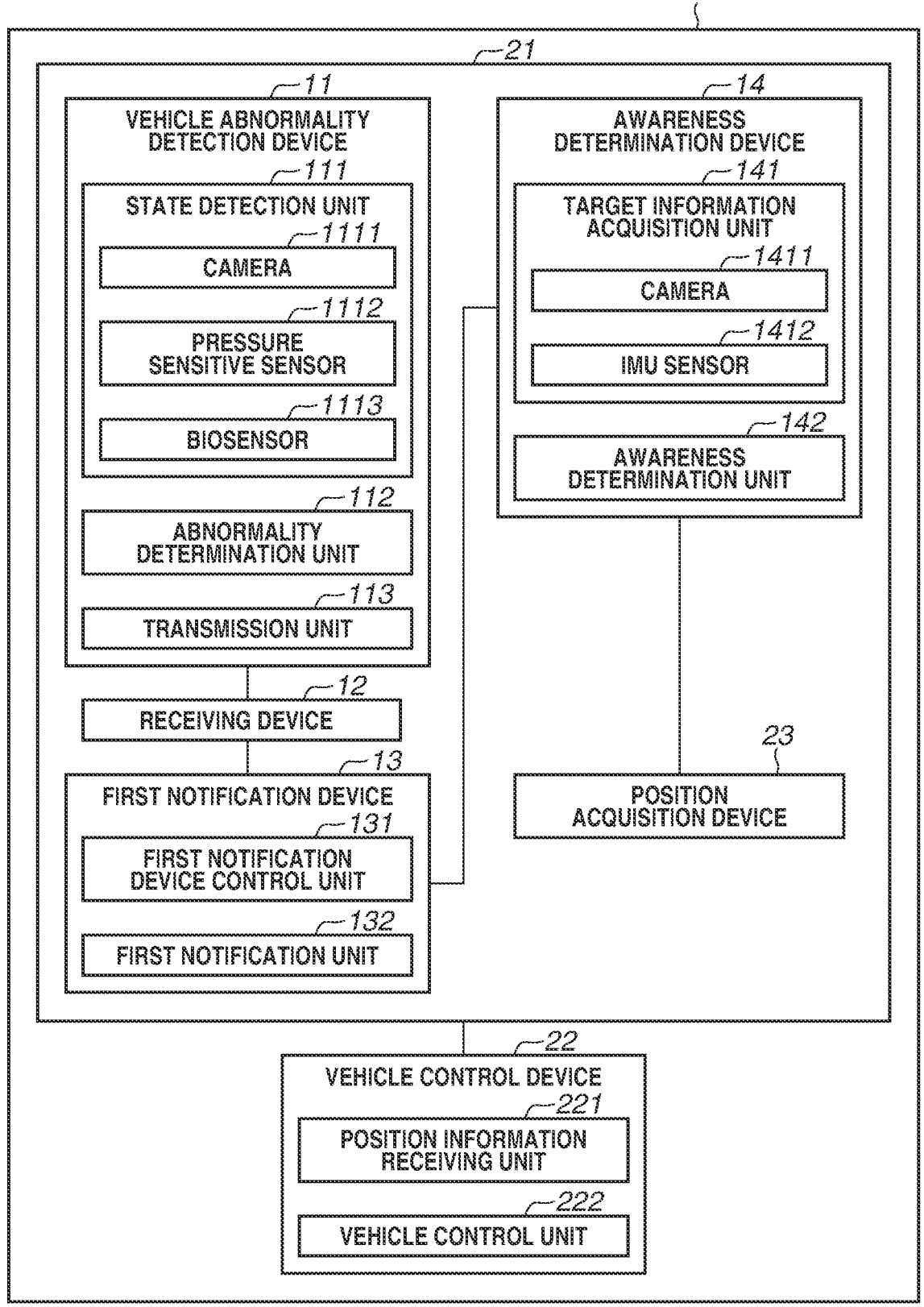
FIG. 6 is a block diagram illustrating elements of the vehicle control system according to the second exemplary embodiment.

FIG. 6 is a block diagram illustrating elements of an abnormality notification system 21 in the second exemplary embodiment.

The vehicle control system 2 includes the abnormality notification system 21 and a vehicle control device 22.

The abnormality notification system 21 includes a vehicle abnormality detection device 11, a receiving device 12, the first notification device 13, an awareness determination device 14, and a position acquisition device 23. The elements of the abnormality notification system 21 have functions similar to those in the first exemplary embodiment, except for the position acquisition device 23.

The position acquisition device 23 includes a known microcomputer having a CPU, a ROM, and a RAM as main components. The position acquisition device 23 has elements and functions similar to those of the position acquisition device in the first exemplary embodiment. The position acquisition device 23 further has a function of outputting position information of a target to the vehicle control device 22.

The vehicle control device 22 includes a known microcomputer having a CPU, a ROM, and a RAM as main components, a position information receiving unit 221, and a vehicle control unit 222.

The position information receiving unit 221 has a function of receiving position information of an unaware target output by the abnormality notification system 21, and outputting the received position information to the vehicle control unit 222.

The vehicle control unit 222 has an automatic driving function of automatically performing crisis avoidance driving for avoiding danger, in a case where it is difficult for the driver 101 to continue driving. The vehicle control unit 222 automatically controls the vehicle, based on position information of a pedestrian or a bicycle near the vehicle 301, position information of other vehicle, and position information of the unaware target, during the automatic driving.

FIG. 7 is a flowchart illustrating an example of a vehicle control process 700 performed by the vehicle control system 2 in the second exemplary embodiment. The vehicle control process 700 in the flowchart of FIG. 7 is a process including the transmission of the position information of the unaware target by the abnormality notification system 21 and the execution of the vehicle control. Processes from when the abnormality notification system 21 detects an abnormality in the driver to when the abnormality notification system 21 acquires the position information are similar to those in the first exemplary embodiment and descriptions thereof will be omitted.

In step S21, the position acquisition device 23 acquires position information of the target unaware of the notification by the first notification device 13, and transmits the acquired position information to the vehicle 301 using communication such as wireless communication.

In step S22, the vehicle control unit 222 performs the automatic driving of the vehicle 301, based on the received position information of the unaware target.

Here, because the driver 101 is in a state where driving is difficult, the vehicle 301 is in a state where manual driving is switched to the automatic driving. FIG. 5 illustrates a situation where the vehicle control system 2 performs the vehicle control to avoid a collision by executing the automatic driving, but a slowdown of the vehicle 301 is not sufficient, and thus the vehicle 301 attempts to pass between the pedestrians 302 and 303.

The vehicle control unit 222 controls the moving direction of the vehicle 301, based on the position information of the target aware of the notification (the aware target) and the position information of the unaware target. Specifically, the vehicle control unit 222 controls the moving direction of the vehicle 301 so that the distance from the vehicle 301 to the unaware target is longer than the distance from the vehicle 301 to the aware target. In other words, each of the distance between the vehicle 301 and the pedestrian 302 and the distance between the vehicle 301 and the pedestrian 303 is determined to be a distance that can ensure the safety of the pedestrian, depending on whether the pedestrian is aware of the notification.

The above-described processes are processes from when the position information of the unaware target is transmitted by the abnormality notification system 21 to when the vehicle control system 2 controls the vehicle 301.

As described above, according to the second exemplary embodiment, the vehicle control system 2 controls the moving direction of the vehicle, based on the position information of the aware target and the unaware target. In other words, the vehicle 301 is controlled so that the distance that can ensure the safety of the unaware target is longer than the distance that can ensure the safety of the aware target, and therefore, the risk of occurrence of damage to the unaware target resulting from a collision with the vehicle can be reduced.

[Third Exemplary Embodiment] A third exemplary embodiment will be described. At least one of the various functions, processes, and methods described in the above-described exemplary embodiments can be implemented using a program. In a third exemplary embodiment, a program for implementing at least one of the various functions, processes, and methods described in the above-described exemplary embodiments will be referred to as "program X". Furthermore, in the third exemplary embodiment, a computer for executing the program X will be referred to as "computer Y". Examples of the computer Y include a personal computer, a microcomputer, and a CPU.

At least one of the various functions, processes, and methods described in the above-described exemplary embodiments can be implemented by the execution of the program X by the computer Y. In this case, the program X is supplied to the computer Y via a computer-readable storage medium. The computer-readable storage medium in the third exemplary embodiment includes at least one of devices such as hard disk device, a magnetic storage device, an optical storage device, a magneto-optical storage device, a memory card, a ROM, and a RAM. Furthermore, the computer-readable storage medium in the third exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-169212, filed Oct. 6, 2020, which is hereby incorporated by reference herein in its entirety.

What is claimed is:

1. A system comprising:
    one or more memories storing instructions; and
    one or more processors executing the instructions to:
        cause a first notification unit to notify a target in a predetermined area of an abnormality, in a case where an abnormal state occurs in a running vehicle;
        detect presence of a target unaware of a first notification; and
        cause a second notification unit different from the first notification unit to notify the target in the predetermined area of the abnormality, in a case where the presence of the target unaware of the first notification is detected.

2. The system according to claim 1, wherein the one or more processors cause the first notification unit to notify the target of a first range and cause the second notification unit to notify the target of a second range wider than the first range.

3. The system according to claim 1, wherein the predetermined area is set based on information about running of the vehicle.

4. The system according to claim 1, wherein the abnormal state includes a malfunction of the vehicle or sudden illness of a driver of the vehicle.

5. A method comprising:
    causing a first notification unit to notify a target in a predetermined area of an abnormality, in a case where an abnormal state occurs in a running vehicle;
    detecting presence of a target unaware of a first notification; and
    causing a second notification unit different from the first notification unit to notify the target in the predetermined area of the abnormality, in a case where the presence of the target unaware of the first notification is detected.

6. The method according to claim 5, further comprising causing the first notification unit to notify the target of a first range and causing the second notification unit to notify the target of a second range wider than the first range.

7. The method according to claim 5, wherein the predetermined area is set based on information about running of the vehicle.

8. The method according to claim 5, wherein the abnormal state includes a malfunction of the vehicle or sudden illness of a driver of the vehicle.

9. A non-transitory storage medium that stores a program causing a computer to execute a method, the method comprising:
    causing a first notification unit to notify a target in a predetermined area of an abnormality, in a case where an abnormal state occurs in a running vehicle;
    detecting presence of a target unaware of a first notification; and
    causing a second notification unit different from the first notification unit to notify the target in the predetermined area of the abnormality, in a case where the presence of the target unaware of the first notification is detected.

10. The system according to claim 1, wherein the first notification unit notifies the target using a different method from that of the second notification unit.

11. The system according to claim 1, wherein the first notification unit notifies the target using a speaker and the second notification unit notifies the target using a device different from a speaker.

12. The method according to claim 5, wherein the first notification unit notifies the target using a different method from that of the second notification unit.

13. The method according to claim 5, wherein the first notification unit notifies the target using a speaker and the second notification unit notifies the target using a device different from a speaker.

* * * * *